(12) United States Patent
Craig (10) Patent No.: US 11,185,012 B2
(45) Date of Patent: Nov. 30, 2021

(54) AGRICULTURAL CUTTING MECHANISM WITH QUICK-CHANGE BLADE

(71) Applicant: DEERE & COMPANY, Moline, IL (US)

(72) Inventor: Paul I. Craig, Thibodaux, LA (US)

(73) Assignee: Deere & Company, Moline, IL (US)

( * ) Notice: Subject to any disclaimer, the term of this patent is extended or adjusted under 35 U.S.C. 154(b) by 180 days.

(21) Appl. No.: 16/592,402

(22) Filed: Oct. 3, 2019

(65) Prior Publication Data

US 2021/0100163 A1 Apr. 8, 2021

(51) Int. Cl.
*A01D 34/73* (2006.01)
*A01D 45/10* (2006.01)
*A01D 34/63* (2006.01)
*A01D 34/66* (2006.01)

(52) U.S. Cl.
CPC ........... *A01D 34/733* (2013.01); *A01D 45/10* (2013.01); *A01D 34/63* (2013.01); *A01D 34/664* (2013.01); *A01D 34/73* (2013.01); *A01D 34/736* (2013.01)

(58) Field of Classification Search
CPC .... A01D 34/733; A01D 45/10; A01D 34/736; A01D 34/73; A01D 34/63; A01D 34/664
See application file for complete search history.

(56) References Cited

U.S. PATENT DOCUMENTS

| 3,507,104 | A | * | 4/1970 | Kline | ................... | A01D 34/733 56/295 |
| 3,604,189 | A | * | 9/1971 | Harer | ................... | A01D 34/664 56/295 |
| 4,313,297 | A | * | 2/1982 | Maier | ................... | A01D 34/733 56/295 |
| 4,750,320 | A | * | 6/1988 | Liebl | .................... | A01D 34/733 56/295 |
| 4,996,828 | A | * | 3/1991 | Jetzinger | .............. | A01D 34/733 56/12.7 |
| 5,175,985 | A | * | 1/1993 | Jetzinger | .............. | A01D 34/733 56/1 |
| 5,622,035 | A | * | 4/1997 | Kondo | ................. | A01D 34/733 30/276 |

(Continued)

FOREIGN PATENT DOCUMENTS

BR MU9001767-6 U2 5/2010
BR 202015016276-1 U2 7/2016

(Continued)

OTHER PUBLICATIONS

John Deere Mower Conditioners Brochure (Jun. 2009) (24 pages).

(Continued)

*Primary Examiner* — Arpad Fabian-Kovacs (57) ABSTRACT

An agricultural cutting mechanism for use with an agricultural machine has a disk rotatable about an axis of rotation, a post secured to the disk, a blade, and a yieldable blade retainer. The blade is removably secured to the disk. The blade comprises a keyhole in which the post is positioned. The blade retainer is secured to the disk to move relative thereto between a blocking position blocking radially inward movement of the blade to the replacement position so as to maintain the blade in the use position and a service position releasing the blade to move radially inward to the replacement position for replacement of the blade with another blade. A blade for use with an agricultural cutting mechanism is also disclosed.

15 Claims, 9 Drawing Sheets

(56) References Cited

U.S. PATENT DOCUMENTS

| | | | | |
|---|---|---|---|---|
| 6,357,215 B1* | 3/2002 | Thorne | ................ | A01D 34/736 56/295 |
| 8,510,959 B2* | 8/2013 | Whitenight | .......... | A01D 34/736 30/276 |
| 8,893,461 B2 | 11/2014 | Nikkei | | |
| 8,931,248 B2* | 1/2015 | Eavenson, Sr. | ...... | A01D 34/733 56/295 |
| 8,935,909 B2* | 1/2015 | Eavenson, Sr. | ........ | A01D 34/73 56/295 |
| 9,485,910 B2 | 11/2016 | Lebeau et al. | | |
| 9,516,813 B2* | 12/2016 | Richard | ................. | A01D 45/10 |
| 9,545,053 B2 | 1/2017 | Fay, II | | |
| 9,992,930 B2* | 6/2018 | Stoffel | ................. | A01D 34/664 |
| 10,117,379 B2 | 11/2018 | Guiet et al. | | |
| 2005/0138913 A1* | 6/2005 | Thompson | .......... | A01D 34/736 56/295 |
| 2012/0318114 A1* | 12/2012 | Esain Eugui | .......... | A01D 45/10 83/651 |
| 2017/0020063 A1 | 1/2017 | Guiet et al. | | |
| 2019/0380268 A1* | 12/2019 | Nielsen | ................ | A01D 34/736 |

FOREIGN PATENT DOCUMENTS

| | | | | |
|---|---|---|---|---|
| JP | 0448934 U | * | 4/1992 | ............. A01D 34/73 |
| WO | WO-9014755 A1 | * | 12/1990 | ........... A01D 34/736 |

OTHER PUBLICATIONS

Vermeer 2018 Mowers Brochure (2017) (13 pages).

Screen captures from YouTube video clip entitled "Vermeer Mowers Quick Clip Blade Retention System," 5 pages, uploaded on Oct. 11, 2017 by user "Martin Gross". Retrieved from Internet: <https://www.youtube.com/watch?v=VUpYLSVscwM>.

* cited by examiner

AGRICULTURAL CUTTING MECHANISM WITH QUICK-CHANGE BLADE

FIELD OF THE DISCLOSURE

The present disclosure relates to agricultural cutting mechanisms with blades, such as, for example, an agricultural cutting mechanism with a blade for a basecutter assembly of a sugarcane harvester.

BACKGROUND OF THE DISCLOSURE

Sugarcane harvesters have a basecutter assembly for severing the stalks of sugarcane plants prior to ingesting the stalks into the machine for chopping and cleaning. The basecutter assembly has a pair of cutting mechanisms, each with a rotating disk and blades secured thereto and spaced about its periphery. From time to time, the blades become worn and need to be replaced. It can take an operator 20 minutes to replace the blades of the basecutter assembly. Some operations may require blades to be replaced every six hours.

SUMMARY OF THE DISCLOSURE

According to an aspect of the present disclosure, there is disclosed an agricultural cutting mechanism for use with an agricultural machine. The agricultural cutting mechanism comprises a disk rotatable about an axis of rotation, a post secured to the disk, a blade, and a yieldable blade retainer. The blade is removably secured to the disk and extends radially beyond the disk in a use position to sever plants in response to rotation of the disk about the axis of rotation upon movement of the machine in a field. The blade comprises a keyhole in which the post is positioned. The blade and the keyhole thereof are movable radially relative to the post between the use position in which the keyhole is secured to the post and a replacement position that is radially inward of the use position and in which the keyhole is removable from the post. The blade retainer is secured to the disk to move relative thereto between a blocking position blocking radially inward movement of the blade to the replacement position so as to maintain the blade in the use position and a service position releasing the blade to move radially inward to the replacement position for replacement of the blade with another blade. The agricultural cutting mechanism thus provides a relatively quick way of installing and replacing a blade.

According to another aspect of the present disclosure, a blade is disclosed for use with an agricultural cutting mechanism associated with an agricultural machine. The agricultural cutting mechanism comprises a disk rotatable about an axis of rotation, a post secured to the disk, and a blade retainer secured to the disk to move relative thereto between a blocking position blocking movement of the blade from a use position to a replacement position and a service position releasing the blade to move to the replacement position for replacement of the blade with another blade. The blade comprises an elongated, flat body, a knife edge extending longitudinally of the body along a side thereof to sever plants in response to rotation of the disk about the axis of rotation upon movement of the machine in a field, a keyhole formed in the body to receive the post, and a positioning edge extending laterally of the body. The keyhole comprises a wider aperture portion and a narrower aperture portion in communication with and narrower than the wider aperture portion to provide the keyhole. The wider and narrower aperture portions are centered on a longitudinal axis of the body with the knife edge and the positioning edge positioned at least partially on longitudinally opposite sides of the narrower aperture portion and the narrower aperture portion is positioned longitudinally between the wider aperture portion and the positioning edge. The narrower aperture portion is provided for receiving the post in the use position of the blade. The wider aperture portion is provided for receiving the post in the replacement position of the blade. The positioning edge may abut the blade retainer when the blade is positioned in the use position and the blade retainer is positioned in the blocking position and disengage the blade retainer when the blade is positioned in the replacement position and the blade retainer is positioned in the service position.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
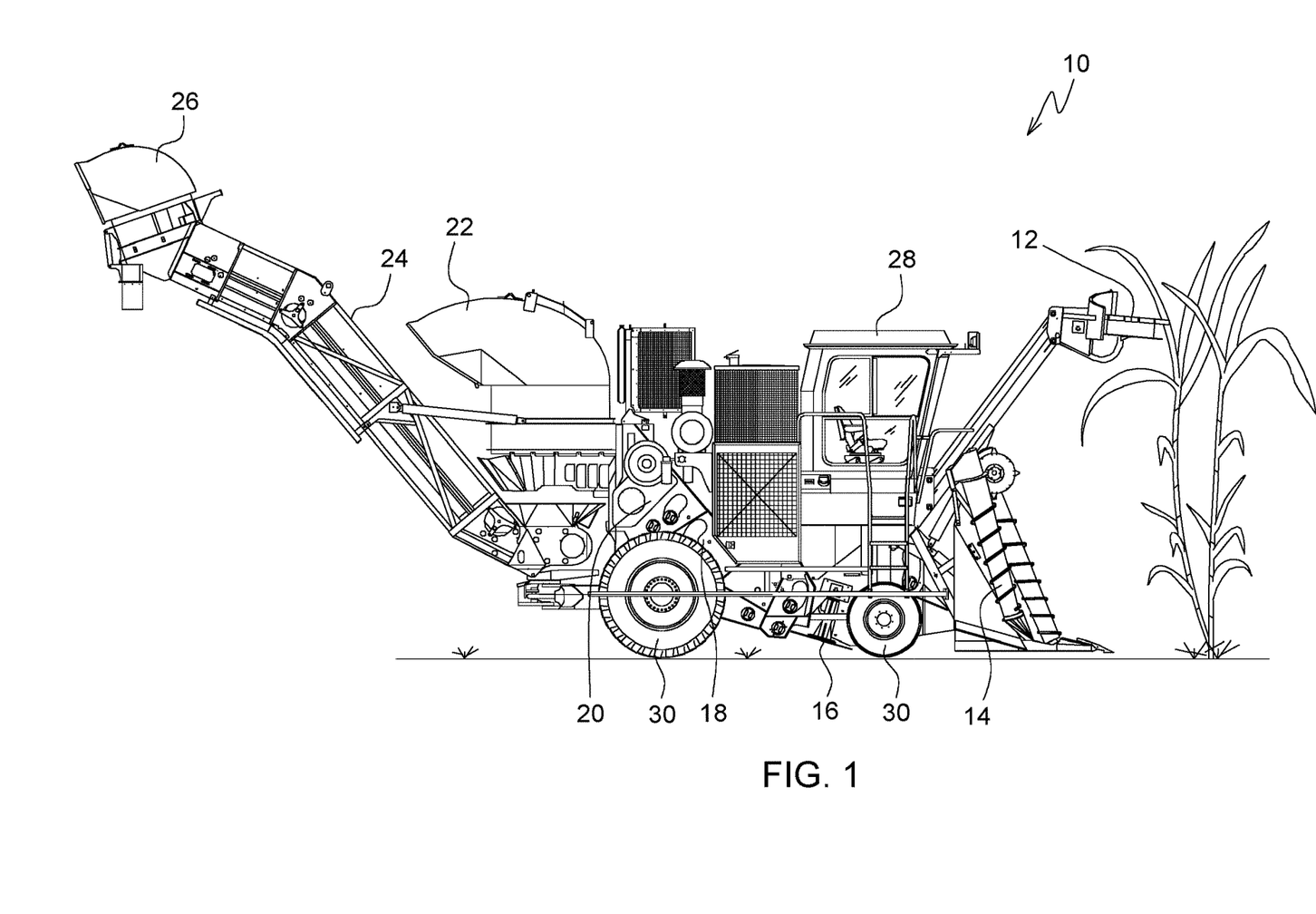
FIG. 1 is a side elevation view showing an agricultural machine in the form of, for example, a sugarcane harvester.

Referring to FIG. 1, an agricultural machine 10 in the form of, for example, a sugarcane harvester is configured to harvest sugarcane. Illustratively, the machine 10 comprises a topper 12, a left and a right crop divider scroll 14 (the left crop divider scroll 14 not shown), an upper knockdown roller and a lower knockdown roller (the knockdown rollers not shown), a basecutter assembly 16, a feed section 18, a chopping section 20, a primary extractor 22, an elevator 24, and a secondary extractor 26. The topper 12 cuts off a leafy top portion of sugarcane plants so as not to be ingested into the machine 10. The left and right crop divider scrolls 14 lift the sugarcane for feeding into the throat of the machine 10.

The basecutter assembly 16 severs sugarcane stalk knocked down forwardly by the knockdown rollers and feeds the severed sugarcane stalk to the feed section 18. The feed section 18 receives from the basecutter assembly 16 a mat of severed sugarcane and feeds the mat rearwardly. The chopping section 20 receives the mat from the feed section 18 and cuts the sugarcane stalk into billets. The primary extractor 22 is positioned downstream from the chopping section 20, separates debris, including, for example, crop residue (e.g., leafy material), from the billets, and removes the debris from the machine 10.

The elevator 24 is positioned at the rear of the machine 10 to receive the cleaned flow of billets, and conveys the billets to an elevated position where the billets are discharged into a wagon to be hauled away. The secondary extractor 26 (some embodiments may not have a secondary extractor) is positioned near the top of the elevator 24, and further separates debris from the billets to remove the debris from the machine 10.

The machine 10 comprises an operator's station 28 and traction elements 30. A human operator may operate the machine 10 from the operator's station 28. The traction elements 30 are positioned on the left and right sides of the machine 10 to propel the machine 10 along the ground. Each traction element 30 may be, for example, a track unit or a ground-engaging wheel (e.g., there is one track unit on each side of the machine 10 as shown, for example, with respect to the right side in FIG. 1).

Figure 2:
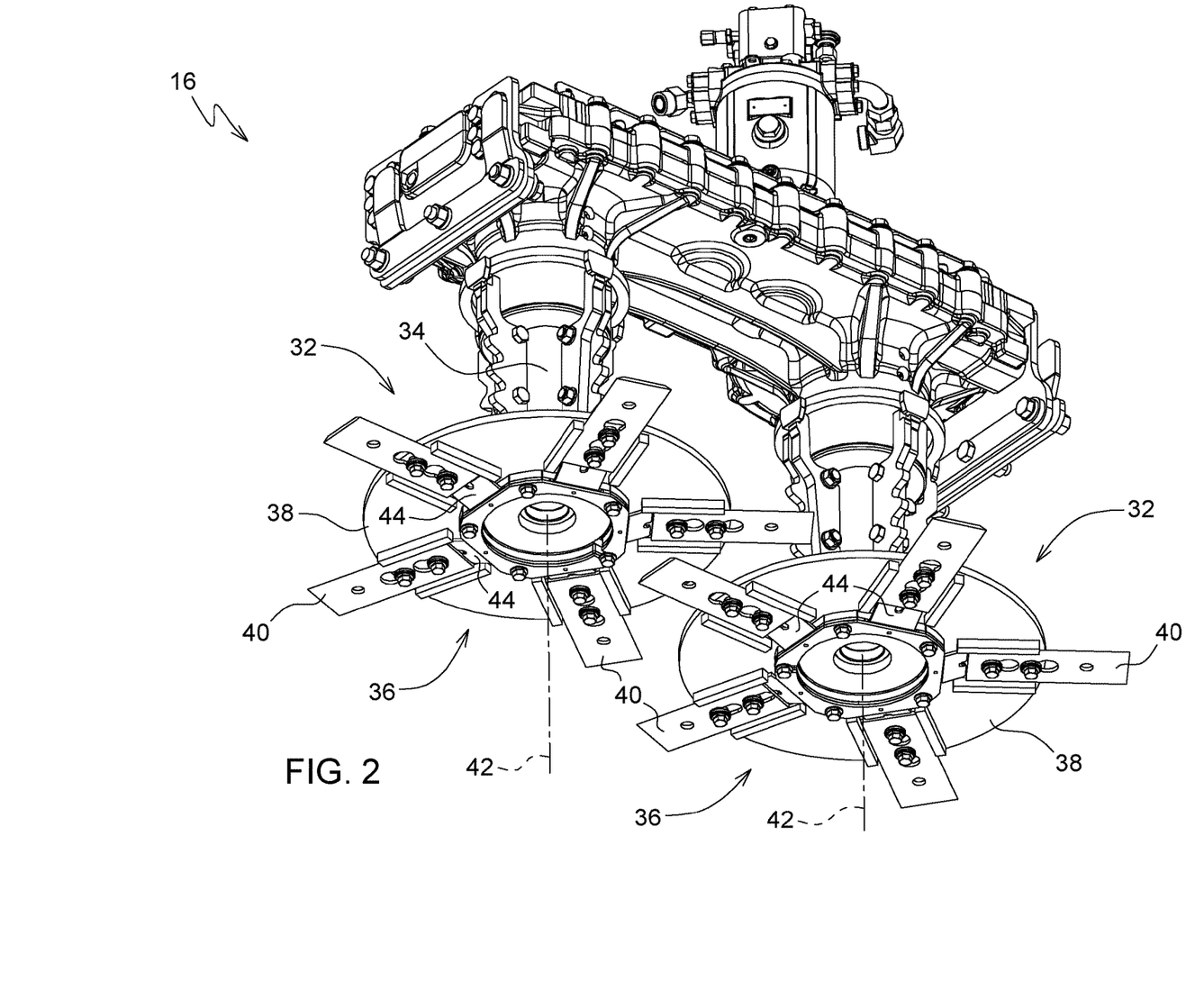
FIG. 2 is a bottom perspective view showing a basecutter assembly of the agricultural machine having a first cutting mechanism and a second cutting mechanism, each with a rotatable disk and quick-change blades mounted to the disk to rotate therewith to sever crop stalk.

Referring to FIG. 2, the basecutter assembly 16 comprises a first agricultural cutting mechanism 32 and a second agricultural cutting mechanism 32. The first and second cutting mechanisms 32 counter-rotate to sever sugarcane stalk at a location near the ground.

Figure 3:
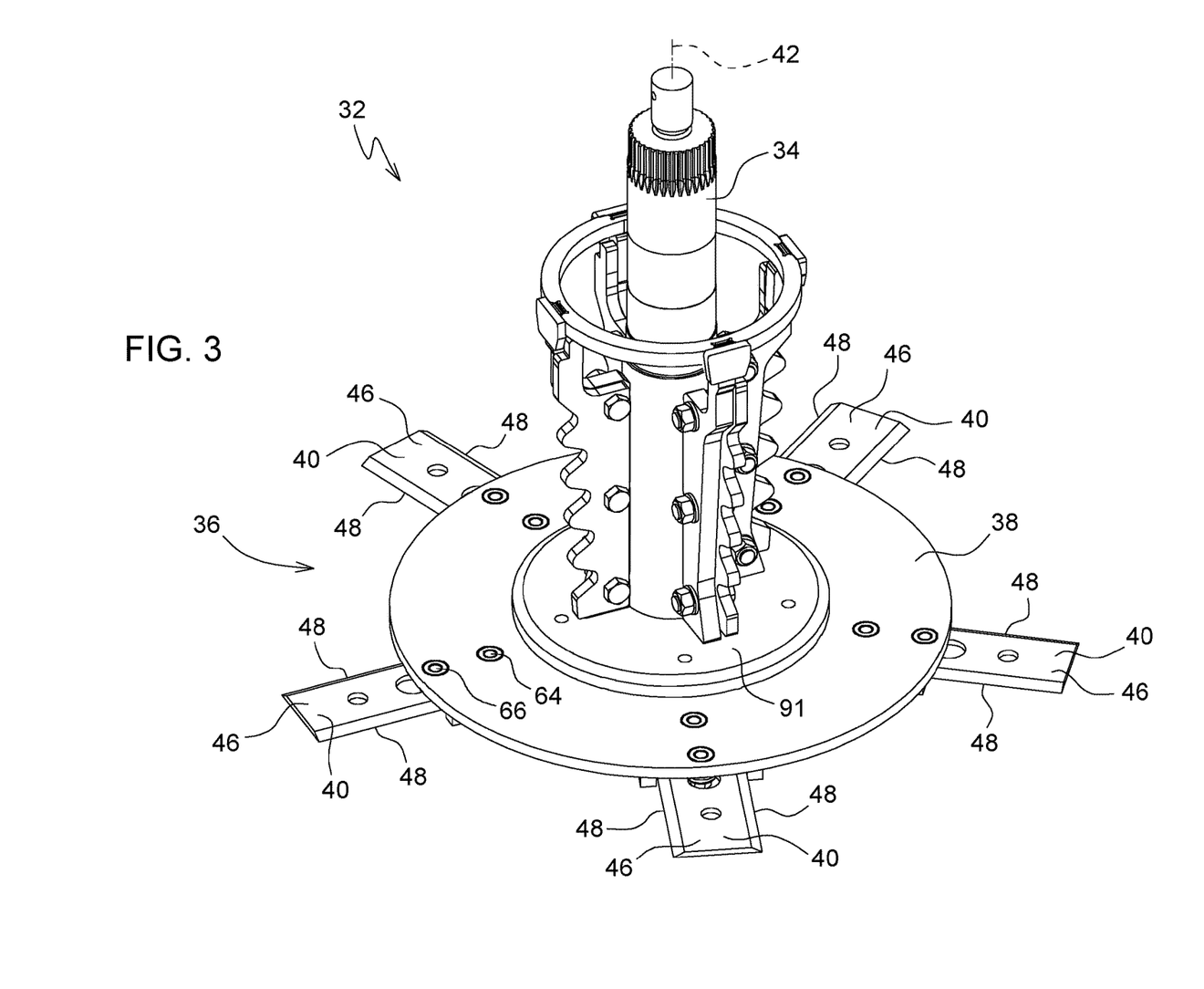
FIG. 3 is a top perspective view showing one of the cutting mechanisms of the basecutter assembly.
Figure 4:
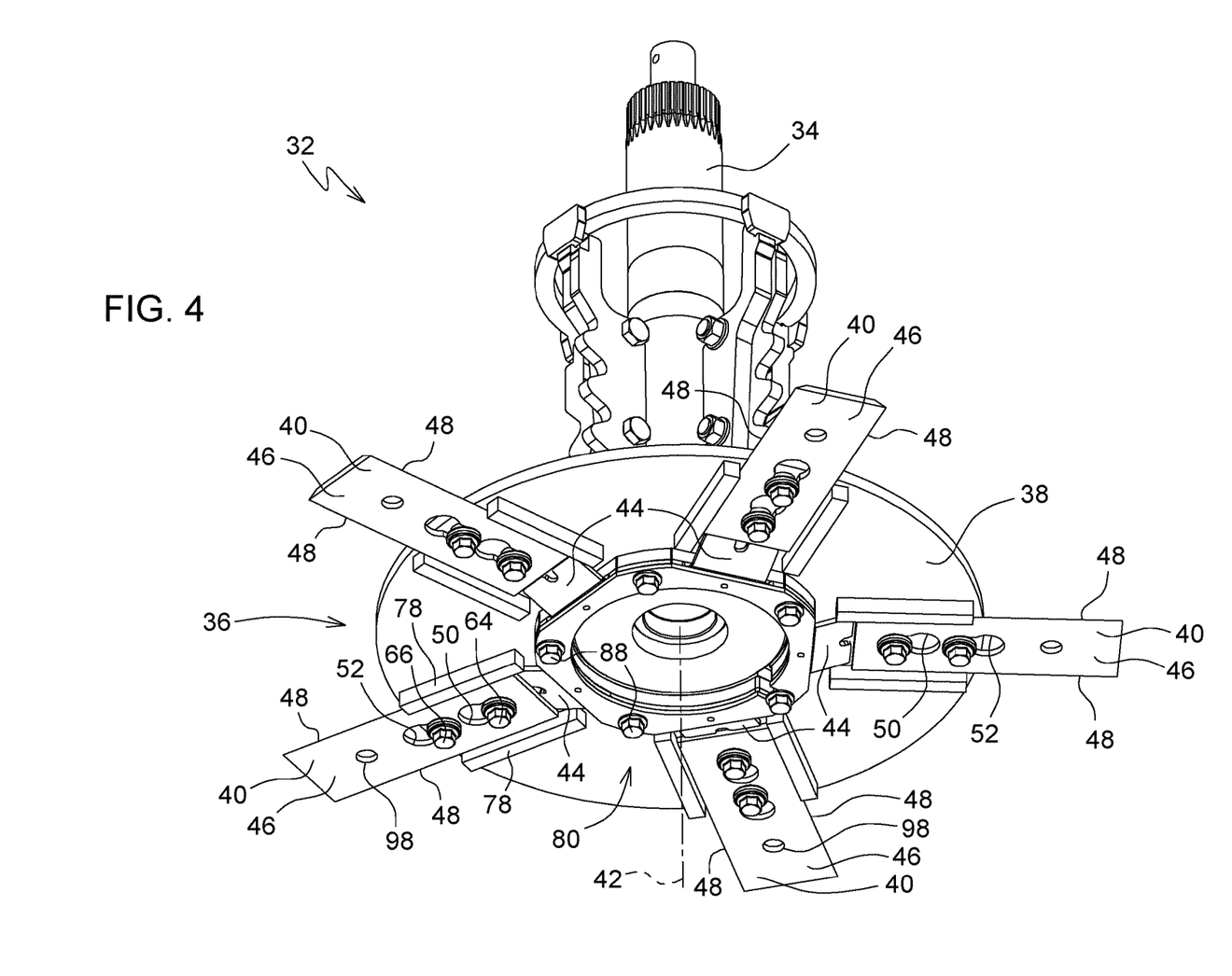
FIG. 4 is a bottom perspective view showing the cutting mechanism.
Figure 5:
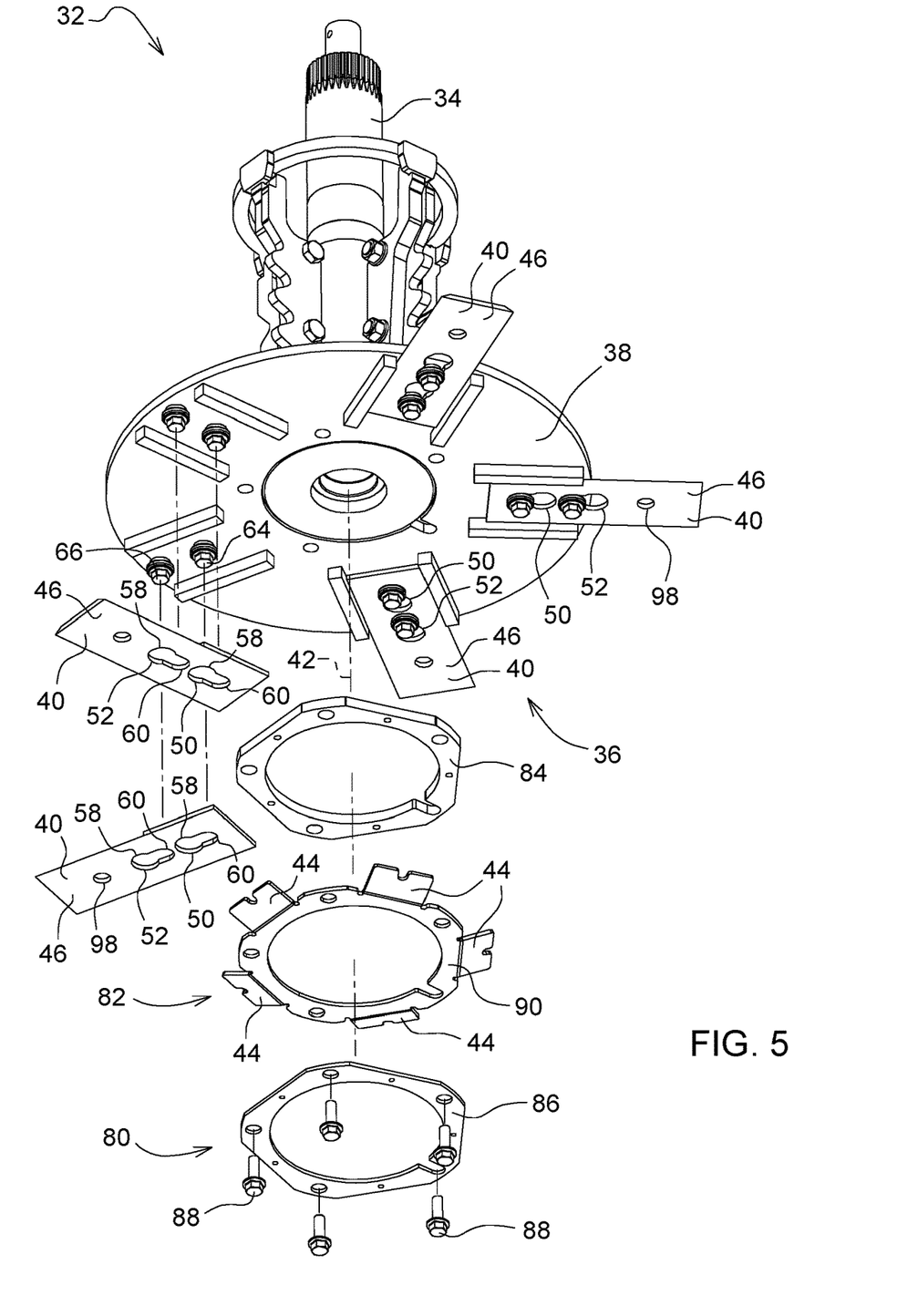
FIG. 5 is an exploded perspective view of the cutting mechanism.

Referring to FIGS. 3-5, each cutting mechanism 32 comprises a rotatable shaft 34 and a cutter 36 mounted to the shaft 34 for rotation therewith. The cutter 36 comprises a disk 38 mounted for rotation about the axis of rotation 42 and quick-change blades 40 (e.g., five) that are positioned about the periphery of the disk 38 and contact the sugarcane stalk to sever the stalk. The disk 38 is rotatable about an axis of rotation 42 defined by the shaft 34. Each blade 40 is removably secured to the disk 38 and extends radially beyond the disk 38 in a use position to sever the plants in response to rotation of the disk 38 about the axis of rotation 42 upon movement of the machine in a field. The cutter 36 has yieldable blade retainers 44, each of which is secured to the disk 38 and associated with a respective blade 40 to maintain the blade 40 in the use position.

Referring to FIGS. 3-9, each blade 40 comprises a body 46, a knife edge 48, a first keyhole 50, a second keyhole 52, and a positioning edge 54 to abut a respective blade retainer 44. The body 46 is flat, generally rectangular, and elongated to define a longitudinal dimension and a lateral dimension of the blade 40. The knife edge 48, keyholes 50, 52, and positioning edge 54 are included in the body 46. The knife edge 48 extends longitudinally of the body 46 along a first side thereof to sever stalks in response to rotation of the disk 38 about the axis 42 upon movement of the machine 10 in a field. The blade 40 may have another knife edge 48 along an opposite side of the body 46. When the operational knife edge 48 wears, the blade 40 may be transferred to the other cutting mechanism 32 to make the less worn knife edge 48 be the operational knife edge 48. In other embodiments, the blade 40 may have only one knife edge 48.

The keyholes 50, 52 are aligned with one another radially relative to the axis 42 and longitudinally relative to the blade 40. The first keyhole 50 is positioned radially inward of the second keyhole 52. The keyholes 50, 52 may be positioned on a central longitudinal axis 62 of the blade 40 and the body 46.

Each of the keyholes 50, 52 has a wider aperture portion 58 and a narrower aperture portion 60. The narrower aperture portion 60 is in communication with and narrower than the wider aperture portion 58 to provide the keyhole 50, 52.

The narrower aperture portion 60 is radially inward of the wider aperture portion 58. The wider and narrower aperture portions 58, 60 are centered on the longitudinal axis 62 with the knife edge 48 and the positioning edge 54 positioned at least partially on longitudinally opposite sides of the narrower aperture portion 60 and with the narrower aperture portion 60 positioned longitudinally between the wider aperture portion 58 and the positioning edge 54.

The cutting mechanism 32 has a first post 64 and a second post 66. The posts 64, 66 are secured to the disk 38 so as to extend downwardly and axially therefrom. The blade 40 is received on the posts 64, 66. The posts 64, 66 are aligned radially with one another such that the first post 64 is positioned radially inward of the second post 66. The first and second keyholes 50, 52 receive respectively the first and second posts 64, 66 such that the first and second posts 64, 66 are positioned respectively in the first and second keyholes 50, 52.

Each post 64, 66 includes a bolt 68, a nut 70, and a sleeve 72. The nut 70 is countersunk into the disk 38. The bolt 68 extends through the sleeve 72 and is threaded to the nut 70 so as to capture the sleeve 72 between the head of the bolt 68 and the disk 38, with the shank of the bolt 68 and a hollow body 76 of the sleeve 72 positioned in the respective keyhole 50, 52. The sleeve 72 includes a flange 74 extending radially outwardly from the body 76. The wider and narrower aperture portions 58, 60 are both sized to receive the body 76. The wider aperture portion 58 is sized to receive the flange 74, such as when the blade 40 is installed or removed from the post 64, 66, but the diameter of the flange 74 is larger than the narrower aperture portion 60, blocking movement of the blade 40 on or off of the post 58, 60 via the narrower aperture portion 60.

Referring to FIGS. 6-9, the blade 40 and its keyholes 50, 52 are movable radially relative to the posts 64, 66 between the use position and a replacement position. In the use position, the keyhole 50, 52 is secured to the respective post 64, 66. The post 64, 66 is positioned primarily in the narrower aperture portion 60 of the respective keyhole 50, 52. The body 76 is positioned primarily in the narrower aperture portion 60 of the respective keyhole 50, 52 such that the flange 74 is out of register with the wider aperture portion 58 of the respective keyhole 50, 52. In the replacement position, the blade 40 is positioned radially inward of the use position and the keyhole 50, 52 is removable from the respective post 64, 66. The post 64, 66 is positioned primarily in the wider aperture portion 58 of the respective keyhole 50, 52 for removal of the blade 40 from the post 64, 66. The body 76 is positioned in the wider aperture portion 58 of the respective keyhole 50, 52 such that the flange 74 is in register with the wider aperture portion 58 of the respective keyhole 50, 52 for passage therethrough upon movement of the blade 40 on or off the post 64, 66.

The cutting mechanism 32 includes a pair of rails 78 associated with each blade 40. The blade 40 is sandwiched between the first and second rails 78 such that the keyholes 50, 52 are at least partially positioned between the first and second rails 78. The posts 64, 66 are positioned between the rails 78 such that twisting shear forces on the blade 40 (e.g., if the blade 40 impacts the ground) are taken up at least partially by the rails 78, not just by the posts 64, 66.

Referring to FIGS. 4-9, the cutting mechanism 32 includes a retainer assembly 80. Illustratively, the retainer assembly 80 includes a retainer ring 82, a spacer ring 84, a holder ring 86, and threaded fasteners 88 (e.g., five). The rings 82, 84, 86 surround the axis of rotation 42. The retainer ring 82 includes the blade retainers 44 and a support ring 90 that surrounds the axis 42 and supports the blade retainers 44 such that the blade retainers 44 project radially outwardly from the support ring 90. The retainer ring 82 is configured, for example, as a single piece, although, in other embodiments, the ring 82 could include multiple pieces. The spacer ring 84 and the holder ring 86 sandwich the support ring 90 to position the blade retainers 44 and hold them in place for movement between a blocking position and a service position. The retainer ring 82, spacer ring 84, and holder ring 86 cooperate to form a stack secured to the disk 38 via the fasteners 88 which pass through the disk 38 and thread into a hub 91 fixed to the shaft 34 (e.g., welded). The spacer ring 84 and the holder ring 86 may be made, for example, of steel, and the retainer ring 82 may be made, for example, of spring steel.

Figure 7:
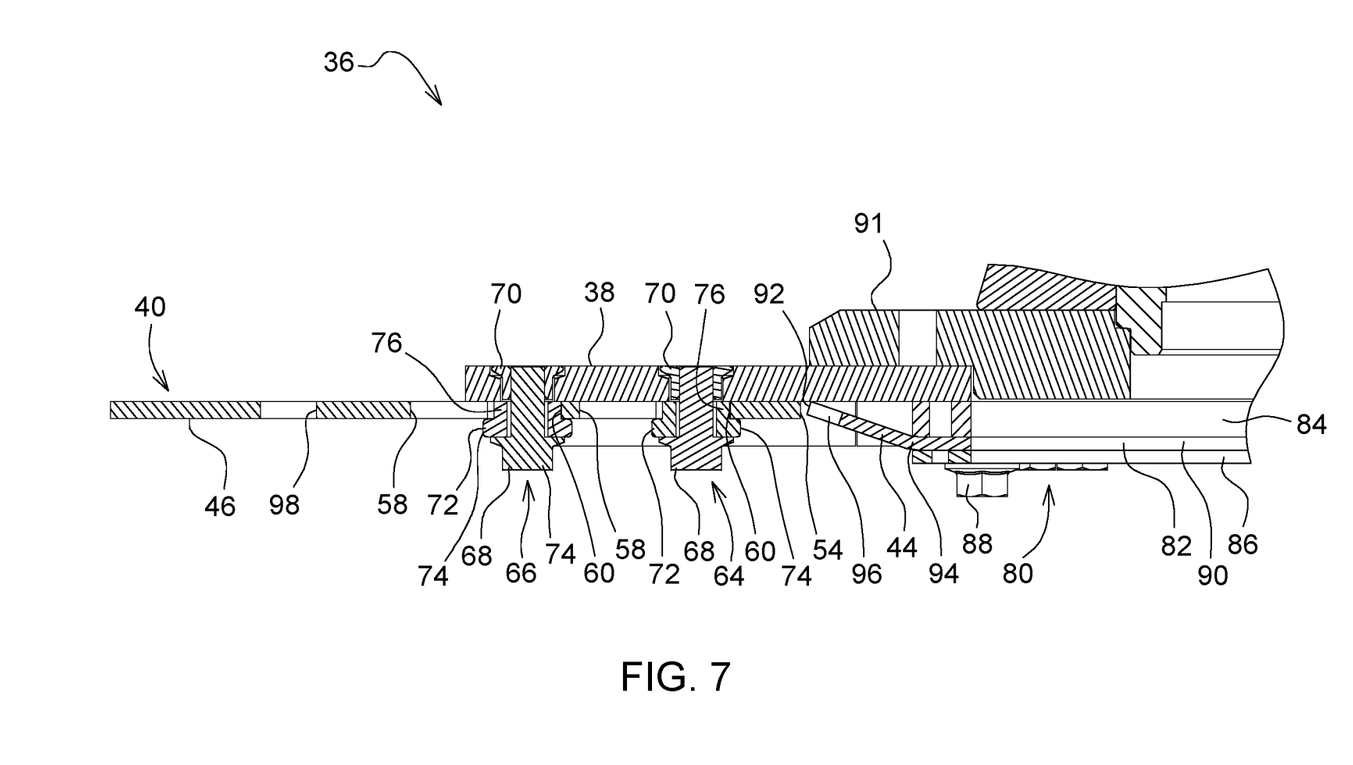
FIG. 7 is a sectional view, taken along lines 7-7 of FIG. 6.
Figure 8:
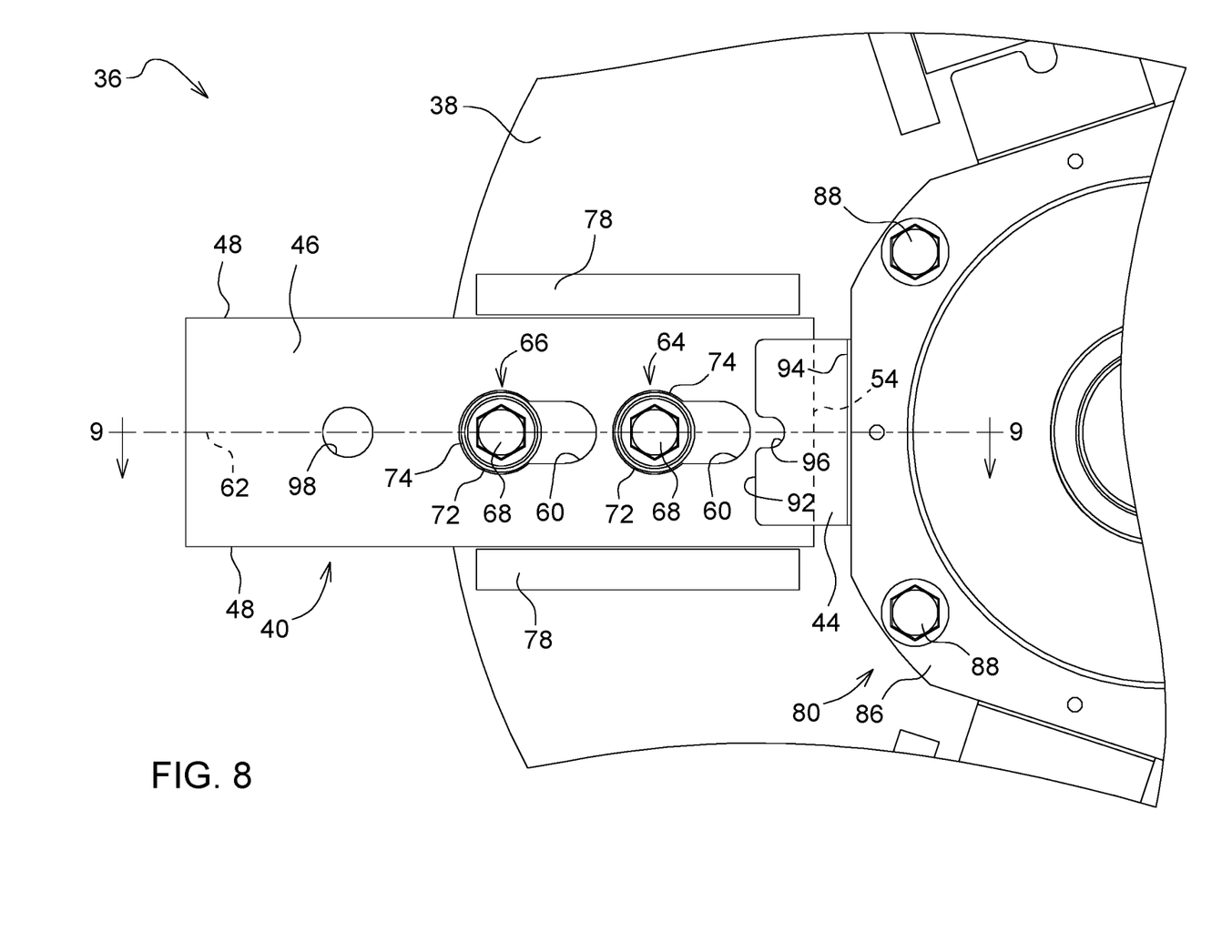
FIG. 8 is a bottom view showing the blade in a replacement position and the blade retainer in a release position.
Figure 9:
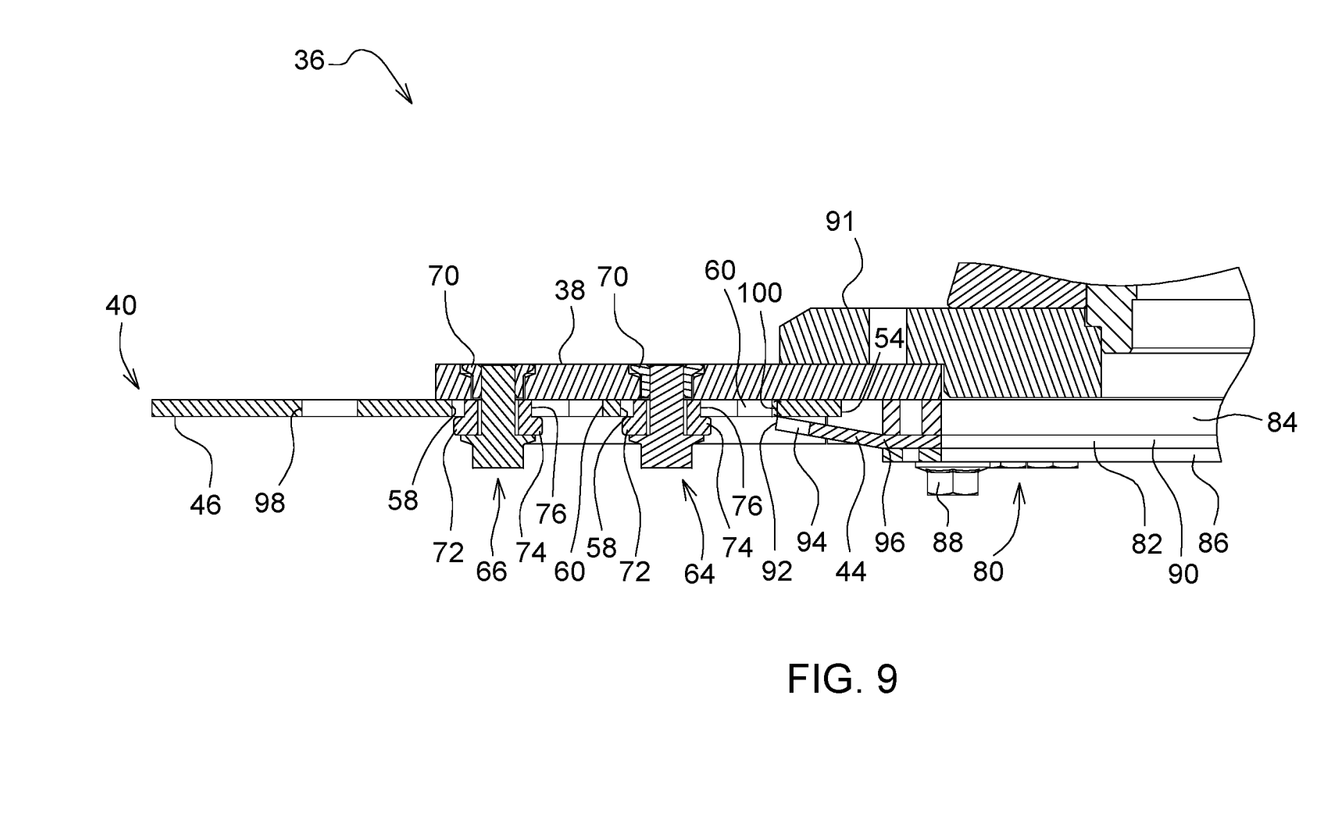
FIG. 9 is a sectional view, taken along lines 9-9 of FIG. 8.

There are a number of blade retainers 44, one for each blade 40. Each blade retainer 44 is yieldable to move relative to the disk 38 between the blocking position (FIGS. 6 and 7) and the service position (FIGS. 8 and 9). In the blocking position, the blade retainer 44 blocks radially inward movement of the blade 40 from the use position to a replacement position so as to maintain the blade 40 in the use position. In the service position, the blade retainer 44 releases the blade 40 to move radially inward of the use position to the replacement position for replacement of the blade 40 with another blade. The blade 40 is positioned radially outward from the blade retainer 44 to abut the blade retainer 44 when the blade 40 is positioned in the use position and the blade retainer 44 is positioned in the blocking position. The blade 40 and the blade retainer 44 are positioned in axially overlapping relation with one another when the blade 40 is positioned in the replacement position and the blade retainer 44 is positioned in the service position.

The blade retainer 44 is yieldably biased upwardly toward the blocking position and manually deflectable downwardly to the service position. In the blocking position, the blade retainer 44 projects radially outwardly from the support ring 90 into contact with the disk 38 such that a radially outer edge 92 of the blade retainer 44 abuts the disk 38. The radially outer edge 92 of the blade retainer 44 contacts the disk 38 to abut the positioning edge 54 of the blade 40 in the blocking position and is deflected away from the disk 38 to release the blade 40 in the service position allowing radial movement of the blade 40 between the use and replacement positions. When the blade retainer 44 is deflected downwardly to the service position, the blade 40 can be moved radially inwardly to shift the keyholes 50, 52 relative to the posts 64, 66 so that the posts 64, 66 are positioned in the wider aperture portions 58 of the keyholes 50, 52 allowing removal of the blade 40 from the posts 64, 66.

The positioning edge 54 of the blade 40 is provided for abutting the blade retainer 44 when the blade 40 is positioned in the use position and the blade retainer 44 is positioned in the blocking position, and for disengaging the blade retainer 44 when the blade 40 is positioned in the replacement position and the blade retainer 44 is positioned in the service position. Illustratively, the positioning edge 54 of the blade 40 extends laterally of the body 46 and is an end edge of the blade, e.g., the radially inner end edge.

The blade retainer 44 is configured, for example, as a tab, having a bend 94 such that, in the blocking position, the tab turns axially toward the disk 38 as the tab projects radially outwardly from the support ring 90 for abutment with the blade 40. The radially outer edge 92 has a tool notch 96 for receiving a tool (e.g., screwdriver) (not shown) to deflect the blade retainer 44 from the blocking position to the service position.

The blade 40 has a tool aperture 98 included in the body 46. The tool aperture 98 is configured to receive a tool (e.g., screwdriver) for a person to pull the blade 40 radially outwardly from the replacement position to the use position. The tool aperture 98 is positioned radially outwardly from the keyholes 50, 52. The tool aperture 98 is aligned radially with the keyholes 50, 52 and positioned on the longitudinal axis 62. The first and second keyholes 50, 52 are positioned between the tool aperture 98 and the positioning edge 54.

Referring to FIGS. 6-9, to install a blade 40, the blade 40 is secured to the disk 38 via the posts 64, 66. Before doing so, the blade retainer 44 is moved from the blocking position to the service position, allowing attachment of the blade 40. A tool (e.g., a screwdriver) is inserted into the tool notch 96 to pry the blade retainer 44 downwardly from the blocking position to the service position, creating a gap 100 between the radially outer edge 92 of the blade retainer 44 and the bottom surface of the disk 38. The radially inner, positioning edge 54 is inserted through the gap 100, and the wider aperture portions 58 of the keyholes 50, 52 are aligned with the posts 64, 66 and fitted over the posts 64, 66 such that the flange 74 and body 76 of the posts 64, 66 are received through the wider aperture portions 58 at which point the blade 40 assumes the replacement position, ready to be moved to the use position. Once the blade is fitted onto the posts 64, 66, the tool can be removed from the tool notch 96, allowing the blade retainer 44 to clamp down onto the blade 40. The tool (or a separate tool) can then be inserted into the tool aperture 98 to pull the blade 40 radially outwardly from the replacement position to the use position. The keyholes 50, 52 are advanced relative to the posts 64, 66 such that the shanks 76 are received in the narrower aperture portions 60 of the keyholes 50, 52 in the use position. As the blade 40 is moved radially outwardly to the use position, the radially outer edge 92 of the blade retainer 44 may slide along the blade 40 until the positioning edge 54 clears the blade retainer 44, at which point the blade retainer 44 snaps upwardly into contact with the disk 38, back to the blocking position.

Figure 6:
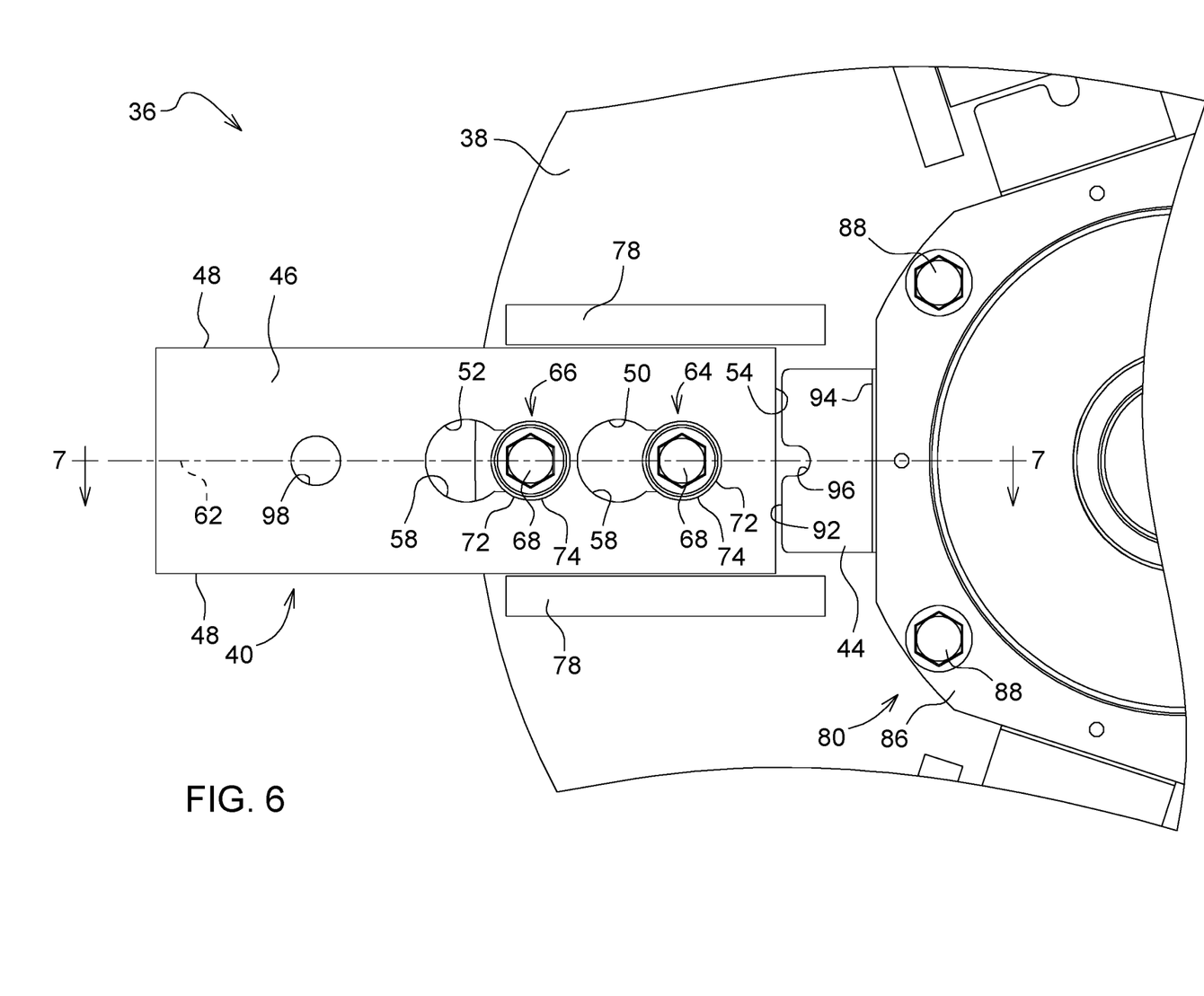
FIG. 6 is a bottom view showing one of the blades in a use position and a blade retainer radially inward of the blade in a blocking position.

In the blocking position, the blade retainer 44 is positioned to contact the positioning edge 54 to block radially inward movement of the blade 40 back to the replacement position so as to keep the blade 40 in the use position on the posts 64, 66. There may be a small space between the blade retainer 44 and the positioning edge 54 when the blade 40 is positioned in its radially outermost orientation and the blade retainer 44 is positioned in the blocking position, creating some wiggle room for the blade 40. This wiggle room is not so much that the blade 40 can fall off the posts 64, 66, such that the blade 40 is considered to be in its use position within that wiggle room between the radially outermost orientation of the blade 40 in which the positioning edge 54 and the blade retainer 44 are out of contact with one another and an orientation involving contact between the positioning edge 54 and the blade retainer 44.

During use of the basecutter assembly 16, the cutting mechanism 32 rotates about the axis 42. During such rotation, the blade 40 is urged radially outwardly by centrifugal force to its radially outermost orientation included in the use position.

The blade 40 can be removed and replaced if the operational knife edge 48 becomes worn. To remove the blade 40, the tool can be inserted into the tool notch 96 to pry the blade retainer 44 downwardly from the blocking position to the service position. The blade 40 is moved radially inwardly from the use position to the replacement position (e.g., a tool may be used to force the blade 40 radially inwardly as needed). In the replacement position, the blade 40 can be removed from the posts 64, 66 by slipping the wider aperture portions 58 of the keyholes 50, 52 over the heads 74 of the posts 64, 66 and tilting the blade at an angle relative to the disk (e.g., about 45 degrees). The blade 40 can then be withdrawn from the gap 100 and removed from the cutting mechanism 32 for replacement with another blade.

In some embodiments, the cutting mechanism 32 may have a single post for the blade 40. As such, the blade 40 may have a single keyhole to be received on the post.

Threads are not shown in the drawings for ease of illustration, but their presence is to be understood.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. An agricultural cutting mechanism for use with an agricultural machine, comprising:
    a disk rotatable about an axis of rotation,
    a post secured to the disk,
    a blade removably secured to the disk and extending radially beyond the disk in a use position to sever plants in response to rotation of the disk about the axis of rotation upon movement of the agricultural machine in a field, the blade comprising a keyhole in which the post is positioned, the blade and the keyhole thereof movable radially relative to the post between the use position in which the keyhole is secured to the post and a replacement position that is radially inward of the use position and in which the keyhole is removable from the post, and
    a yieldable blade retainer secured to the disk to move relative thereto between a blocking position blocking radially inward movement of the blade to the replacement position so as to maintain the blade secured to the post in the use position and a service position releasing the blade to move radially inward to the replacement position for replacement of the blade with another blade.

2. The agricultural cutting mechanism of claim 1, wherein the blade retainer is yieldably biased toward the blocking position and manually deflectable to the service position.

3. The agricultural cutting mechanism of claim 2, wherein the blade retainer contacts the disk to abut a positioning edge of the blade in the blocking position and is deflected away from the disk to release the blade in the service position allowing radial movement of the blade between the use and replacement positions.

4. The agricultural cutting mechanism of claim 2, wherein the blade is positioned radially outward from the blade retainer to abut the blade retainer when the blade is positioned in the use position and the blade retainer is positioned in the blocking position, and the blade and the blade retainer are positioned in axially overlapping relation with one another when the blade is positioned in the replacement position and the blade retainer is positioned in the service position.

5. The agricultural cutting mechanism of claim 2, comprising a support ring secured to the disk and surrounding the axis of rotation, and the blade retainer is configured as a tab projecting radially outwardly from the support ring.

6. The agricultural cutting mechanism of claim 5, wherein a radially outer edge of the tab comprises a tool notch for receiving a tool to deflect the tab.

7. The agricultural cutting mechanism of claim 5, wherein the tab comprises a bend such that the tab turns axially toward the disk as the tab projects radially outwardly from the support ring for abutment with the blade.

8. The agricultural cutting mechanism of claim 1, comprising a second post secured to the disk, wherein the blade comprises a second keyhole in which the second post is positioned.

9. The agricultural cutting mechanism of claim 8, wherein the post is a first post, the keyhole is a first keyhole, the first and second posts are aligned radially with one another, the first and second keyholes are aligned radially with one another and positioned on a central longitudinal axis of the blade.

10. The agricultural cutting mechanism of claim 1, wherein the disk comprises a first rail and a second rail, and the blade is sandwiched between the first and second rails such that the keyhole is at least partially positioned between the first and second rails.

11. The agricultural cutting mechanism of claim 1, wherein the keyhole comprises a wider aperture portion and a narrower aperture portion in communication with and narrower than the wider aperture portion to provide the keyhole, the narrower aperture portion is radially inward of the wider aperture portion, and the blade is movable radially relative to the post between the use position in which the post is positioned primarily in the narrower aperture portion and the replacement position the post is positioned primarily in the wider aperture portion for removal of the blade from the post.

12. The agricultural cutting mechanism of claim 1, wherein a positioning edge of the blade facing the axis of rotation and a radially outer edge of the blade retainer are arranged to contact one another when the blade is in the use position and the blade retainer is in the blocking position.

13. The agricultural cutting mechanism of claim 1, wherein the post is secured to the disk when the blade retainer is positioned in the blocking position and the service position.

14. The agricultural cutting mechanism of claim 5, wherein the support ring and the tab are single piece.

15. The agricultural cutting mechanism of claim 5, comprising more than one blade retainer, wherein an outer periphery of the support ring is polygonal with multiple sides, from each of which one of the blade retainers projects radially outwardly and is configured as a tab.

* * * * *